Sept. 26, 1933.                C. COHEN-VENEZIAN                1,928,369
                                SECTIONABLE TRUCK
                              Filed May 21, 1930              2 Sheets-Sheet 1
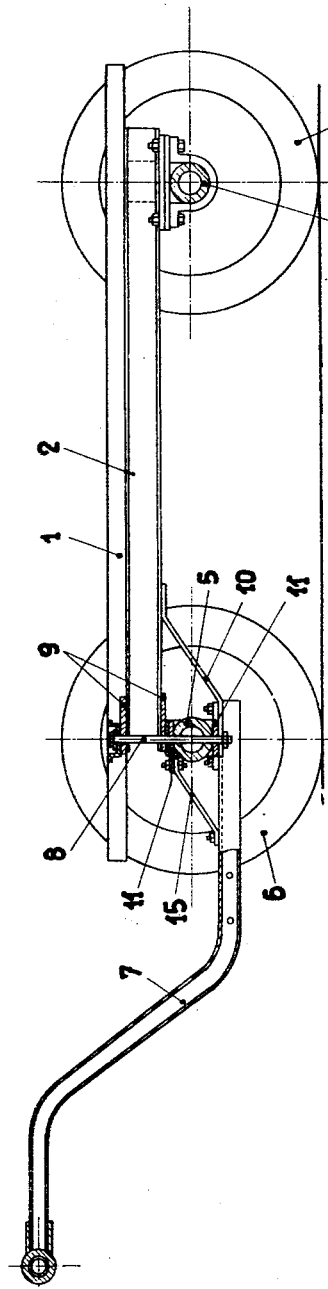
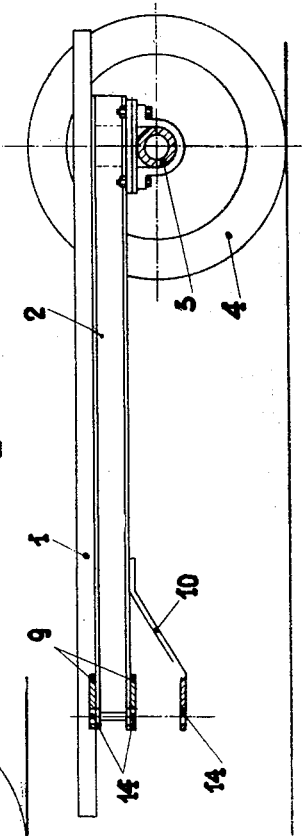
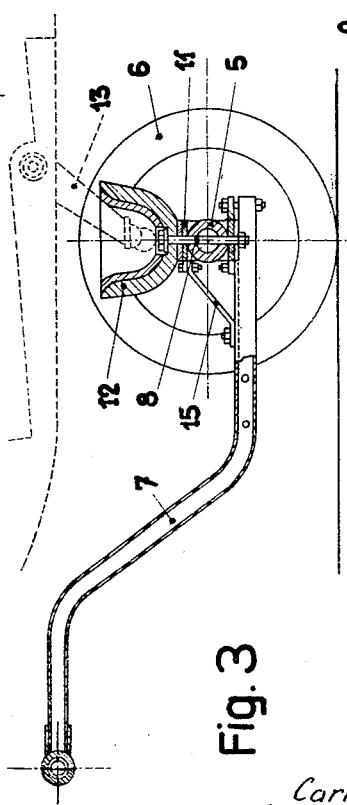
Inventor,-
Carlo Cohen-Venezian
by E. F. Wenderoth
                                                                 Attys.

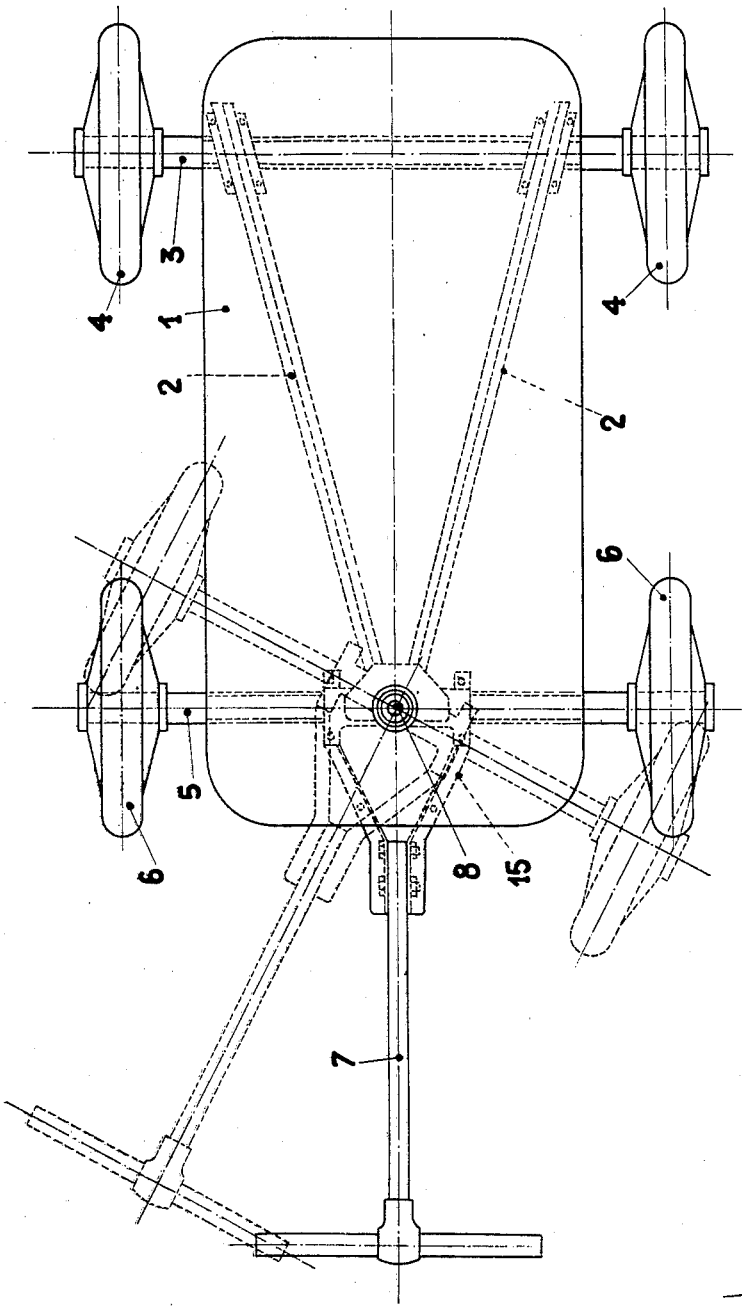

Patented Sept. 26, 1933

1,928,369

UNITED STATES PATENT OFFICE 1,928,369

SECTIONABLE TRUCK

Carlo Cohen-Venezian, Turin, Italy

Application May 21, 1930, Serial No. 454,439, and in Italy May 28, 1929

1 Claim. (Cl. 280—114)

This invention comprises a four-wheeled truck separable in sections and adapted to be used in its whole in aircraft landing fields and the like for carrying loads, said truck comprising a two-wheel section adapted to be affixed to tail of aeroplanes for manœuvring the same by hand on land.

On the annexed drawings is shown by way of example an embodiment of the present invention, and Figure 1 is a vertical longitudinal section of a composite truck;

Figure 2 is a plan view of Figure 1;

Figure 3 is a central vertical section of the front axle or removable section of the truck removed from the truck body and in condition for use to support an aeroplane tail;

Figure 4 is a side view with parts in section of the truck body with its single axle.

As illustrated, the truck of this invention comprises a platform 1 reinforced by bars 2, 2 and having an axle 3 running on wheels 4. Plates 9, 9 and a strut 10 having registering holes 14 are secured on platform structure.

A steering axle 5 having wheels 6 and a steering pole or bar 7 is removably connected with platform 1; perforated plates 11 and reinforcing struts 15 are fastened on said axle 5.

In the illustrated embodiment the interconnection of truck steering axle 5 with body or platform 1 is secured by a vertical pintle 8 passing through registering holes 14 of plates 9, 9 and strut 10 of platform 1 and of axle 5 and plates 11.

In assembled conditions of Figures 1 and 2, the device provides a four-wheeled truck which may be driven by acting on its pole bar 7 which is also of use for steering it by oscillating the front axle 5 about pintle 8, as shown in dotted lines in Figure 2.

To avail of the described truck to manœvre an aeroplane on land, pintle 8 is removed to separate front axle 5 from the truck body or platform 1 which holds its rear wheeled axle 3 as shown in Figures 3 and 4. Then, by means of pintle or bolt 8, a cup 12 is fastened on said axle 5 (Figure 3) said cup 12 being intended to receive the end of an aeroplane sprag 13.

When in conditions of Figure 3, axle 5 supports the rear portion of an aeroplane structure (as shown in dotted lines) whose front portion bears on usual aeroplane wheels (not shown). Then an aeroplane may be handled or manœuvred at will on land.

When the truck is assembled as in Figures 1 and 2, it may be used for handling loads and charges and particularly for handling aeroplane engines in landing fields.

The above described truck owing to its feature of being able of being separated in sections may be stored in any place and be carried on service vehicles.

What I claim as my invention and desire to secure by United States Letters Patent is:

A truck comprising a platform, a wheeled axle secured to the platform adjacent the rear end thereof, cooperating plates and a strut secured to said platform adjacent the front end thereof and having substantially vertically aligned openings extending therethrough, a second wheeled axle, a steering bar extending therefrom, two plates on said steering bar, disposed one above and one below said last-mentioned axle, said last-mentioned plates and said last-mentioned axle having substantially vertically aligned openings therein adapted to coincide with said first-mentioned openings, and a pintle extending through said aligned openings and pivotally securing the front axle to said platform, the said platform thus being removable from said second wheeled axle, whereby a cup may be secured to said wheeled axle, for supporting the tail skid of an aeroplane.

CARLO COHEN-VENEZIAN.